March 9, 1954

A. FONG 2,671,858

LINEAR SWEEP GENERATOR

Filed April 3, 1946

INVENTOR
ARTHUR FONG

BY *M. A. Hayes*

ATTORNEY

Patented Mar. 9, 1954

2,671,858

UNITED STATES PATENT OFFICE 2,671,858

LINEAR SWEEP GENERATOR

Arthur Fong, Los Angeles, Calif.

Application April 3, 1946, Serial No. 659,187

1 Claim. (Cl. 250—36)

This invention relates to sweep generators and more particularly to an improved sweep generator for producing a very linear sweep.

In cathode ray oscilloscope presentation of short duration signals it is imperative that a very linear sweep voltage be applied to the horizontal deflecting plate in order that an undistorted representation results. Various combinations of resistance-capacitance charging circuits, and inductance-capacitance resonance circuits have been used in the past with reasonably good results, and with additional circuit elements and feedback arrangements very linear sweeps have been obtained. In portable test equipment where reduction in weight and bulk are prime factors, it is desirable to provide a circuit that will generate a very linear sweep voltage with a minimum of circuit components.

The primary object of the present invention is to provide a linear sweep voltage generator.

Another object of the present invention is to provide a generator, that produces a sawtooth voltage wave that is linear, with a minimum of component parts.

A further object of the present invention is to provide a linear sweep circuit for use in portable field test equipment.

Figure 1:
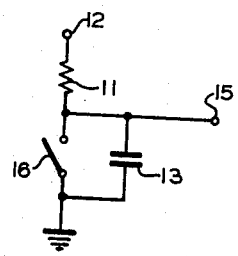
Figure 1:
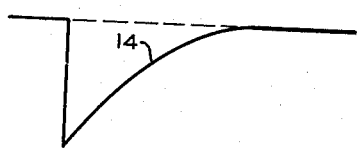
Figure 1:
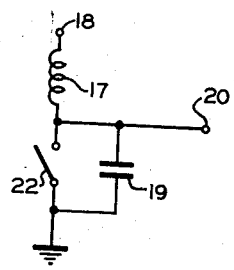
Figure 1:
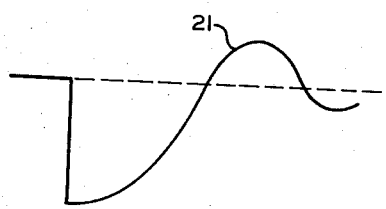
Figure 1:
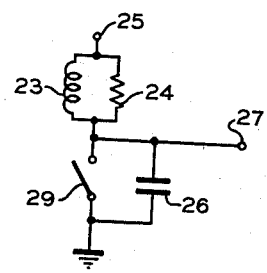
Figure 1:
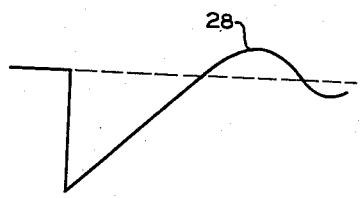
Figure 2:
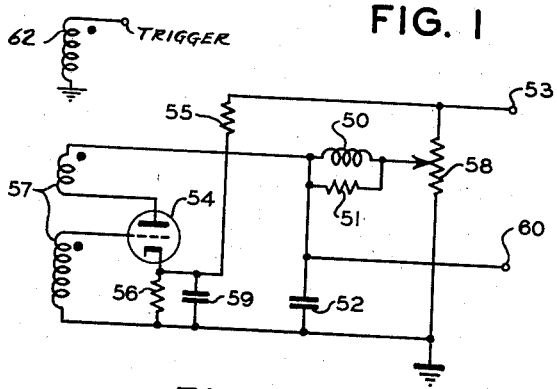

The foregoing and other objects will become apparent from the detailed description and the accompanying drawings in which:

Fig. 1 illustrates the effect of superimposing resistance-capacitance and resonance charging curves; and Fig. 2 is a schematic diagram of a typical circuit employing the superposition principle illustrated in Fig. 1.

Referring to the drawings, and more particularly to Fig. 1, the elementary circuit consisting of resistance 11 connected to a source of positive voltage at terminal 12, and condenser 13, will produce the well known exponential charging curve 14 at terminal 15 when switch 16 is momentarily closed and then reopened. The circuit consisting of inductance 17 connected to a source of positive voltage at terminal 18, and condenser 19 will produce at terminal 20 the also well known resonance charging curve 21, when switch 22 is momentarily closed and then reopened. If inductance 23 is put in parallel with resistance 24 and connected to a source of positive voltage at terminal 25, the output voltage across condenser 26 at terminal 27 will follow curve 28, when switch 29 is momentarily closed and reopened. With proper selection of inductance 23, resistance 24, and capacitance 26, curve 28 will be very linear during the period of time required for most sweep voltage applications.

Figure 2 is a schematic diagram of a typical circuit using a combination resistance-capacitance and inductance-capacitance charging circuit to generate a linear sweep voltage. Inductance 50, resistance 51 and capacitance 52 make up the charging circuit described above, and the rest of the circuit provides a self-synchronous switching arrangement for the generation of a sawtooth voltage. A positive voltage applied at terminal 53 produces a fixed cathode potential on electron tube 54 by voltage divider action between resistances 55 and 56. Transformer 57 provides an inductive feedback circuit between the plate and the grid of electron tube 54. With a fixed bias on electron tube 54 it is necessary that the plate potential be of sufficient value to overcome this bias before the tube will conduct. Electron tube 54 must necessarily be off during the charging period of the sawtooth voltage output. The potential across condenser 52 charges through inductance 50 and resistance 51 toward the value of voltage at point 58. As some point on the charging curve, the potential on condenser 52 and hence on the plate of electron tube 54, will be high enough to cause the tube to conduct. As the current builds up through the plate winding of transformer 57, the potential on the grid of tube 54 is caused to rise by the action of transformer 57 thus causing the tube to conduct very heavily. Condenser 59 is sufficiently large that during this time of heavy conduction, condenser 52 is quickly discharged toward the potential existing on the cathode of tube 54. When the current no longer is increasing through the plate windings of transformer 57, the potential on the grid of tube 54 is driven down and the tube cuts off sharply, and a new charging cycle begins. It is apparent, then that a self synchronous sawtooth voltage appears at output terminal 60. The period of the sawtooth voltage can be varied by adjustment of the potential at point 58.

This is a special switching arrangement, and it will be apparent to those skilled in the art that other switching systems can be used with the invention equally as well. The conventional gas switch tube could easily be adapted to this circuit to provide adequate switching. Another switching arrangement utilizing the above described circuit with an external triggering feature could be used in other applications of the present invention. A triggering voltage schematically illustrated by the legend "Trigger" applied inductively by means of winding 62 to the grid winding of transformer 57 could be used to synchronize the sawtooth voltage output in time relation with other circuits. The foregoing description of switching methods used with the invention should not be construed as a definition of the invention, but is considered illustrative of one form the invention may take.

What is claimed is:

A linear sweep voltage generator capable of generating a cyclicly recurring sawtooth voltage comprising, an inductance, a resistance, said inductance connected in parallel with said resistance, an adjustable source of positive voltage, one end of said parallel resistance-inductance combination connection to said adjustable source of positive voltage, a condenser, said condenser connected in series with said parallel resistance-inductance combination and said adjustable source of positive voltage, an electron tube, said electron tube having at least an anode, a cathode and a control grid, a source of positive voltage, a voltage divider, the cathode of said electron tube connected to said voltage divider, said voltage divider connected to said source of positive voltage, a transformer, the primary winding of said transformer connected in series between the anode of said electron tube and the junction of said parallel resistance-inductance combination and said condenser, the secondary of said transformer connected between the grid of said electron tube and ground, the combination of said electron tube, said voltage divider, and said transformer serving as a switch, said switch opening and closing in correct time sequence with the charging period of said inductance resistance and condenser, said adjustable source of positive voltage determining the period of said sawtooth voltage obtained at the junction of said condenser and said parallel resistance-inductance combination.

ARTHUR FONG.

References Cited in the file of this patent
UNITED STATES PATENTS

| Number | Name | Date |
| --- | --- | --- |
| 2,085,402 | Vance | June 29, 1937 |
| 2,096,982 | Schlesinger | Oct. 26, 1937 |
| 2,105,177 | Barthelemy | Jan. 11, 1938 |
| 2,148,096 | Banks | Feb. 21, 1939 |
| 2,188,653 | Faudell et al. | Jan. 30, 1940 |
| 2,413,063 | Miller | Dec. 24, 1946 |
| 2,438,845 | Dodds | Mar. 30, 1948 |
| 2,562,925 | Lader | Aug. 7, 1951 |

FOREIGN PATENTS

| Number | Country | Date |
| --- | --- | --- |
| 434,326 | Great Britain | Aug. 29, 1935 |